(12) United States Patent
Belenkii

(10) Patent No.: US 8,025,425 B2
(45) Date of Patent: Sep. 27, 2011

(54) BEACONLESS ADAPTIVE OPTICS SYSTEM

(75) Inventor: Mikhail Belenkii, San Diego, CA (US)

(73) Assignee: Trex Enterprises Corp, San Diego, CA (US)

( * ) Notice: Subject to any disclaimer, the term of this patent is extended or adjusted under 35 U.S.C. 154(b) by 782 days.

(21) Appl. No.: 12/157,014

(22) Filed: Jun. 6, 2008

(65) Prior Publication Data

US 2009/0028198 A1    Jan. 29, 2009

Related U.S. Application Data

(60) Provisional application No. 60/933,603, filed on Jun. 6, 2007.

(51) Int. Cl.
*F21S 8/00* (2006.01)

(52) U.S. Cl. ...................... 362/277; 250/201.9; 356/450; 356/484; 356/521; 359/16

(58) Field of Classification Search ............... 250/201.9; 356/450, 456, 484, 521; 359/16; 362/220–225, 362/217.02–217.17, 269–289, 296.01, 296.1, 362/297–310, 341, 368–372, 384–385, 418–430, 362/433–456
See application file for complete search history.

*Primary Examiner* — William Carter
(74) *Attorney, Agent, or Firm* — John R. Ross

(57) ABSTRACT

An improved beaconless adaptive optics system and process. A target is illuminated with a high energy laser beam of a directed energy laser. Wave front measurements are made of high energy laser beam reflections from the target. These wave front measurements are analyzed by a high speed processor to determine both high frequency phase components and low frequency phase components in the wave front data. (Applicants' experiments have shown that there is a direct correlation between beam spot size on the target and the phase variance of the reflected laser beam. The correlation is: the greater the phase variance the smaller the beam spot size.) Applicants have developed a technique for providing special control algorithms that provide very high speed control of the elements of a deformable mirror using this phase variance as a feedback parameter. Applicants have also developed algorithms to correct a limited number of Zernike modes associated with the wave front control.

5 Claims, 15 Drawing Sheets

BEACONLESS ADAPTIVE OPTICS SYSTEM

CROSS REFERENCE TO RELATED APPLICATIONS

This application claims the benefit of provisional patent application Ser. No. 60/933,603 filed Jun. 6, 2007.

FEDERAL SPONSORED RESEARCH

The present invention was made in the course of performance of Contract Nos. FA9451-06-D-0006 and FA9451-04-C-0321 with the United States Air Force and the United States Government has rights in the invention.

FIELD OF INVENTION

The present invention relates to imaging and laser projection systems and in particular to such systems involving turbulence.

BACKGROUND OF THE INVENTION

Directed Energy Systems

Since the invention of the laser, consideration has been given to development of directed energy systems. These systems require techniques to maximize the laser power density on the target. This means the laser "spot size" on the target must be as small as possible. Recent progress in high power laser technology makes these systems feasible. However, depositing lethal flux on the target over sufficient time requires mitigation of the atmospheric turbulence effects on a laser beam. This is because atmospheric turbulence produces distortions that tend to spread out the laser beam to increase the spot size on the target, reducing the flux to harmless levels.

Adaptive Optics Systems

Adaptive optics systems have been utilized to analyze wave front distortions in the atmosphere and modify the outgoing laser beam to compensate for the distortion so that when the beam arrives at the target the laser spot on the target is close to the same size as it would be if there was no atmospheric distortion. This is typically done with a wave front monitor and deformable mirrors. In order to measure the wave front distortions between the laser and the target a beacon in line with the target is needed. Light from this beacon is analyzed with a wave front monitor to determine the distortion. For example in some cases light from a star in line with the target may be analyzed to determine distortions. Cooperative targets can be provided with a beacon light source. However, most non cooperative targets would not provide a light source that could serve as a beacon and other in line light sources may not be available.

BACKGROUND PAPERS

The following list of references provide a good review of the technology to which the present invention relates:
1. D. W. Hardy, *Adaptive Optics for Astronomical Telescopes*, Oxford University Press, 1998.
2. M. Belen'kii and K. Hughes, Beacon Anisoplanatism, Proceeding of SPIE, Vol. 5087, 69-82 (2003)
3. M. A. Vorontsov, V. P., Sivokon, "Statistic parallel-gradient-descent technique for high-resolution wave-front phase-distortion correction," J. Opt. Soc. Am., Vol. 15, pp 2745-2758 (1998).
4. M. A. Vorontsov, G. W. Carhart, M. Cohen, and G. Gauwenberghs, "Adaptive optics based on analog parallel stochastic optimization: analysis and experimental demonstration," J. Opt. Soc. Am., Vol. 17, 1440-1453 (2000).
5. M. A. Vorontsov, "Decoupled stochastic parallel gradient descent optimization for adaptive optics: integrated approach for wave-front sensor information fusion," J. Opt. Soc. Am., Vol. 19, pp. 356-368 (2002).
6. M. Vorontsov and G. Carhart, "Adaptive phase distortion correction in strong speckle-modulation conditions," Optics Letters, Vol. 27 21552157 (2002).
7. T. Weyrauch and M. A. Vorontsov, "Atmospheric compensation with a speckle beacon in strong scintillation conditions: directed energy and laser communication applications," Appl. Opt., Vol. 44, pp. 6388-6401 (2005).
8. J. C. Spall, "Multivariable stochastic optimization using a simultaneous perturbation gradient approximation," IEEE Trans. Autom. Control, Vol. 37, pp. 332-341 (1992).
9. J. C. Spall, "An Overview of the Simultaneous Perturbation Method for Efficient Optimization," John Hopkins APL Technical Digest, Vol. 19, Number 4, 1998.
10. V. I. Tatarskii, *Wave Propagation in a Turbulent Medium*, (McGraw-Hill, New York, 1961).
11. M. Belen'kii, "Tilt angular anisoplanatism and full-aperture tilt-measurement technique using a laser guide star," Appl. Optics, Vol. 39, 6097-6108 (2000).
12. T. Goldring, and L. Carlson, "Analysis and implementation of non-Kolmogorov phase screens appropriate to structured environments," in *Nonlinear Optical Beam Manipulation and High Energy Beam Propagation Through the Atmosphere*, R. A. Fisher and L. E. Wilson, eds., Proc. SPIE Vol. 1060, pp. 244-264, 1989.
13. J. M. Martin, and S. M. Flatte, "Simulation of point-source scintillation through three-dimensional random media," J. Opt. Soc. Am., Vol. 7, pp. 838-847, 1990.
14. M. Belen'kii, J. Barchers, E. Berg, D. Bruns, D. Fung, R. Gallant, C. Kirk, V. Rye, H. Runyeon, and J. Voass, "Laboratory Demonstration of Wavefront Based Stochastic Parallel Gradient Descent Adaptive Optics System," Proceeding of SPIE, Vol. 6708, (2007).
15. Robert J. Noll, "Zernike polynomials and atmospheric turbulence", J. Opt. Soc. Am./Vol. 66. No. 3, March 1976.

Non Cooperative Targets

Techniques have been proposed for using laser light reflected from the target to serve as the beacon for purposed of measuring the wave front distortions to then iteratively adapt the laser to compensate for the distortion. For example, a target-in-loop (TIL) beam control approach has been developed by M. Vorontsov and others which uses an iterative optimization algorithm—Stochastic Parallel Gradient Decent (SPGD) algorithm to generate deformable mirror (DM) commands and utilizes a performance metric to provide feedback to an optimization algorithm to achieve maximum laser power density at the target. The TIL approach does not require a beacon laser, instead it provides feedback for the optimization algorithm by using the HEL return from the target. Both image-based and speckle-based performance metrics were used.

However, since light reflected from the target propagates back to the laser platform through turbulence and thermal blooming, both thermal blooming and turbulence degrade the beacon image and thus limit the sensitivity of the performance metric to the variations of the HEL beam spot size at the target. So, the imaging system may not be able to resolve small variations of the beam spot size at the target at each iteration of the optimization algorithm.

What is needed is a better approach to beam control.

SUMMARY OF THE INVENTION

The present invention provides an improved beaconless adaptive optics system and process. A target is illuminated with a high energy laser beam of a directed energy laser. Wave front measurements are made of high energy laser beam reflections from the target. These wave front measurements are analyzed by a high speed processor to determine both high frequency phase components and low frequency phase components in the wave front data. (Applicants' experiments have shown that there is a direct correlation between beam spot size on the target and the phase variance of the reflected laser beam. The correlation is: the greater the phase variance the smaller the beam spot size.) Applicants have developed a technique for providing special control algorithms that provide very high speed control of the elements of a deformable mirror using this phase variance as a feedback parameter. Applicants have also developed algorithms to correct a limited number of Zernike modes associated with the wave front control.

DETAILED DESCRIPTION OF PREFERRED EMBODIMENTS

A first preferred embodiment of the present invention provides a beam control approach somewhat similar to the approached pioneered by M. Vorontsov and others that is discussed in the background section of this specification. Applicants have introduced a concept of a Wavefront-based Stochastic Parallel Gradient Decent (WSPGD) adaptive optics system, which uses off-axis wavefront measurements of laser return to provide feedback for an optimization algorithm. Applicants have validated this concept in simulation using a wave-optics code. The WSPGD adaptive optics system concept is based on three findings:

the phase aberrations of laser return from the target contain information about beam spot size at the target;

the variance of differential local wavefront tilt depends inversely proportional on beam spot size at the target; and correction of a limited number of low-order Zernike modes significantly increases on-axis intensity and power in the bucket at the target. We evaluated the performance of the WSPGD adaptive optics system in simulation for two tactical engagement scenarios.

This specification is organized as follows. Applicants first examine the effect of an extended beacon on wavefront statistics of laser return. The WSPGD adaptive optics system concept is then described along with a preferred WSPGD algorithm and its implementation. Applicants then describe wave optics simulation results for two tactical engagement scenarios.

Effect of Extended Beacon on Reflected Beam

Figure 1:
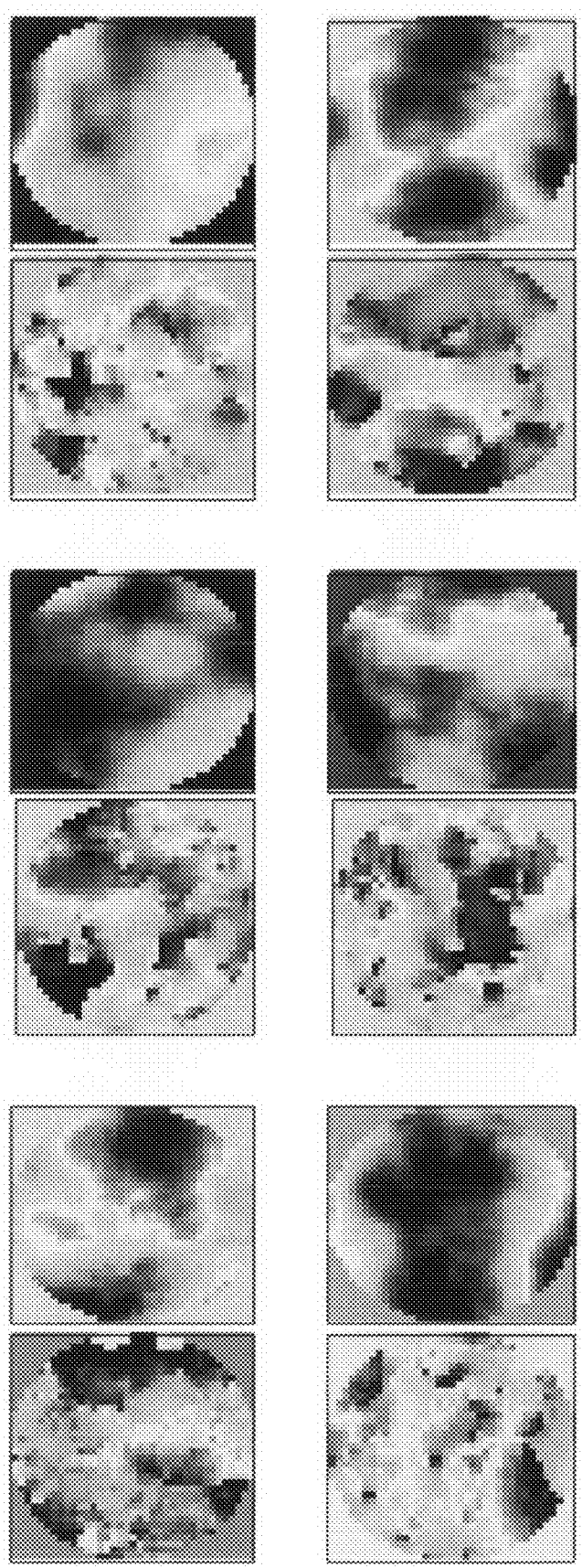
FIG. 1 depicts phase maps of laser returns of point and extended beacons.

A very important discovery by Applicants is that the wavefront statistics of laser return from a spot on a target contain information about beam spot size at the target. FIG. 1 depicts the phase maps of laser return for a point and an extended beacon at a downlink 700 km path, from the relay mirror to the target, for an extended range airborne laser for six independent turbulent realizations. It is seen that the phase maps for a point and an extended beacon differ strongly from each other. The phase maps for point beacons (left) contain both low and high frequency phase components, whereas the phase maps for the extended beacons (right) include exclusively low frequency phase components. The high frequency phase components are removed from the wavefront before it arrives at the wavefront sensor.

Figure 2:
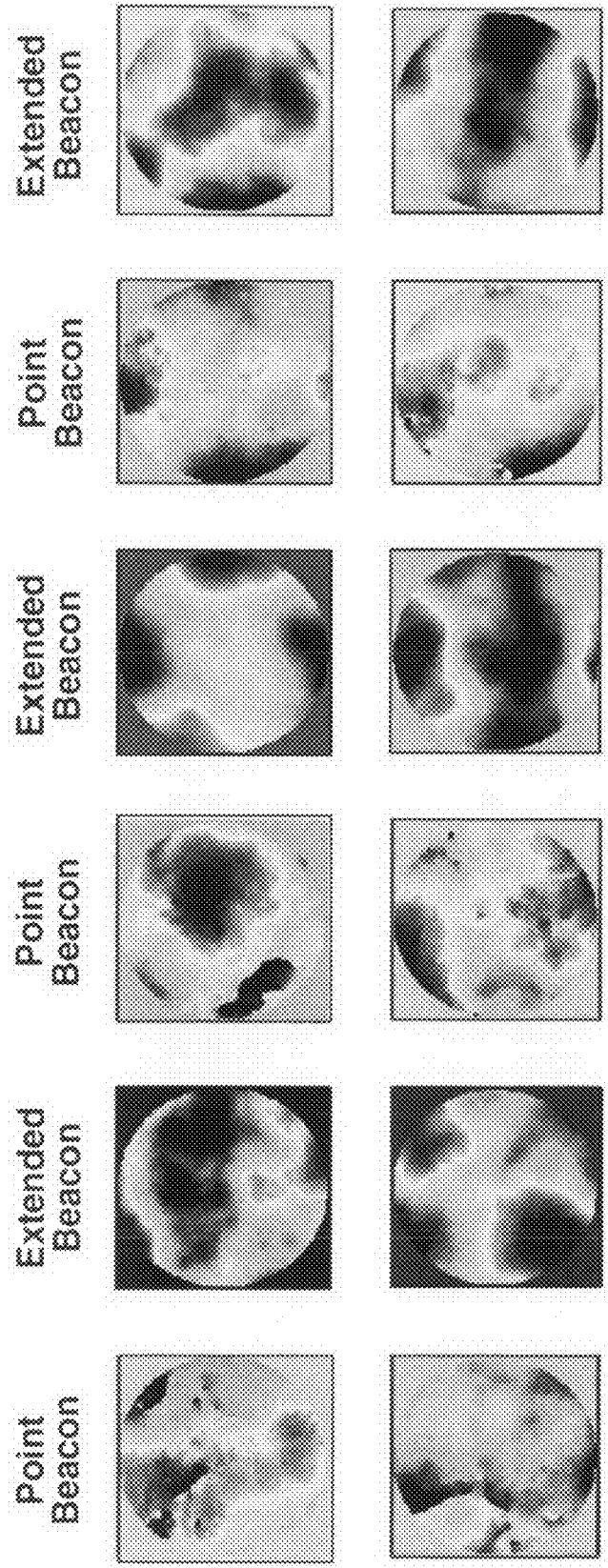
FIG. 2 depicts similar results for a horizontal 20 km path.

FIG. 2 depicts similar results for a horizontal L=20 km path. The wave propagation parameters are: the plane wave Rytov variance, $\sigma_x^2 = 0.307\ k^{7/6} C_n^2 L^{11/6} = 1.2$, where $C_n^2$ is the refractive index characteristic and $k=2\pi/\lambda$ is the wave number; the coherence radius, or Fried parameter, $r_0 = (0.423\ k^2 C_n^2 L)^{-3/5}$; $D/r_0 = 10$, where D is the telescope diameter; the isoplanatic angle, $\theta_0 = ((\frac{3}{8})2.91 k^2 C_n^2 L^{8/3})^{-3/5}$; and $\theta_B/\theta_0 = 20$, where $\theta_B = \lambda/r_0$ is the mean beam spot size at the target. Once again, the phase maps of the point beacons (left) contain both low and high frequency phase components, whereas the phase maps of the extended beacons (right) include only low frequency components. The high spatial frequency phase components (local tilts) are removed from the wavefront of laser return due to spatial averaging of phase aberrations over the beacon angular extent. This phase averaging effect is similar to averaging of the scintillations over an angular size of a planet or averaging of a full aperture tilt over a laser beacon angular extent.

The above results imply that an extended beacon acts as a low pass filter, filtering out the high frequency phase aberrations of laser return. This effect makes turbulence appear less random in a wavefront sensor, thus reducing the root mean square (rms) phase aberrations. As a consequence, the phase aberrations of laser return from an extended beacon contain information about beam spot size at the target.

Figure 3:
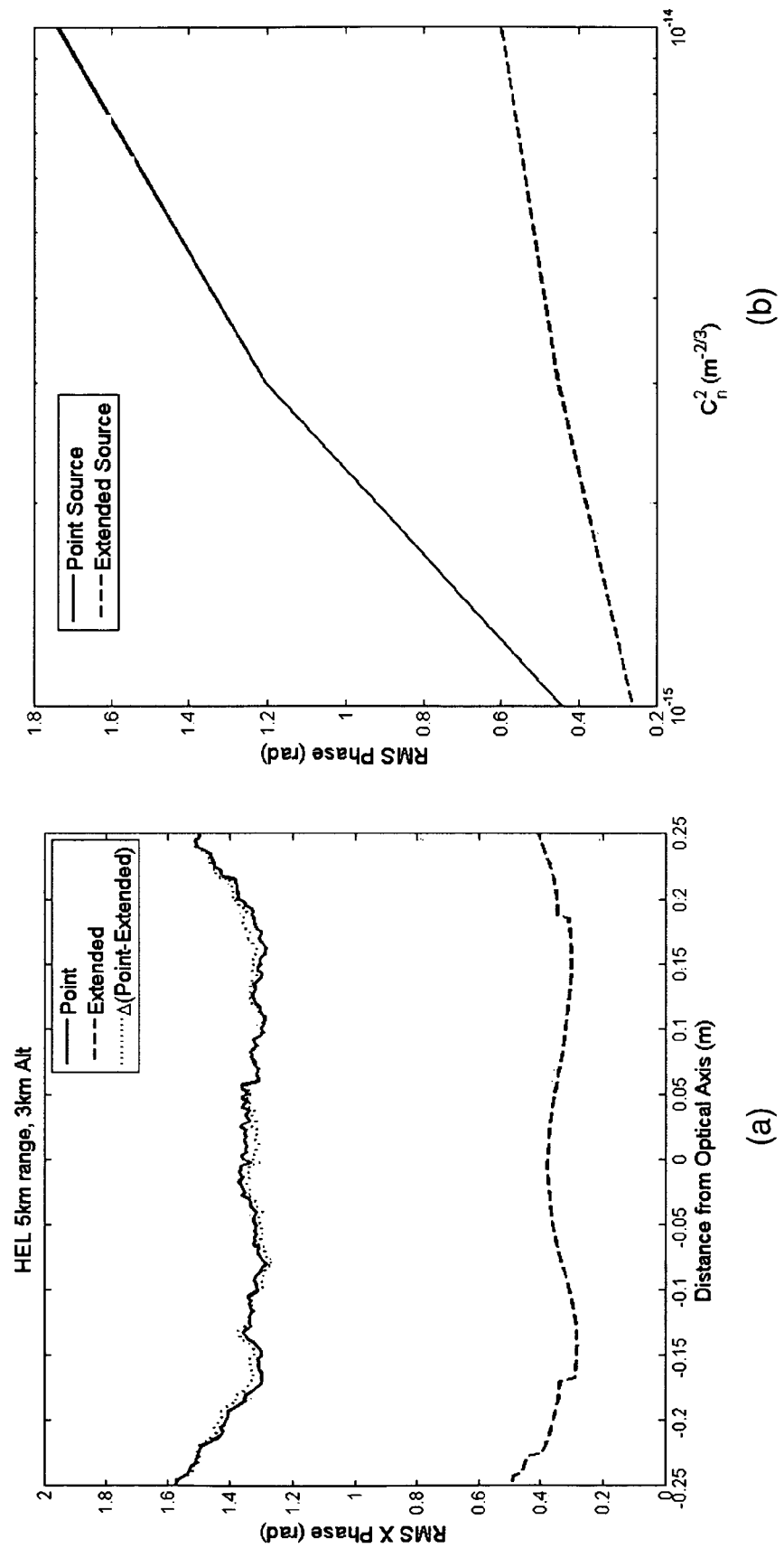
FIGS. 3a and 3b show rms phase aberrations.

FIG. 3A depicts rms phase aberrations of a laser return from a point beacon (solid curve), an extended beacon (thick dashed curve), and their difference (fine dashed curve), versus distance from the optical axis for a 5 km slant range and 3 km laser platform altitude. The rms phase aberrations for a point beacon exceed that for an extended beacon by more than a factor of 3. Thus, a small beam spot size at the target corresponds to high values of the rms phase. The implication is that the phase measurements of a laser return can provide a feed back for a beam control algorithm.

Also the reader should note that the rms phase difference between a point and extended beacon is close to the rms phase for a point beacon. This explains why beacon anisoplanatism degrades a phase conjugate adaptive optics system performance. A lot of high frequency phase components in a wavefront of a laser return from an extended beacon does not allow us to focus the beam to a diffraction limited spot. When the wavefront corrupted by beacon anisoplanatism is applied to an outgoing beam, a corrected beam tends to match the size of an extended beacon, but not the point source. This degrades the system performance. At the same time, these phase measurements can provide a useful signal for beam control algorithm.

FIG. 3B depicts rms phase aberrations for a point (solid curve) and extended beacon (dashed curve) versus refractive index structure characteristic $C_n^2$ on a horizontal 10 km path. The rms phase for a point beacon exceeds that for an extended beacon for all values of $C_n^2$. Also, the difference between rms phase for a point and extended beacon increases when the strength of turbulence increases. Thus the rms phase aberrations of a laser return for an extended beacon are more sensitive to variations of beacon spot size at the target with increasing strength of turbulence. Applicants employ this property in a WSPGD beam control approach for correcting Beacon Anisoplanatism.

Figure 4:
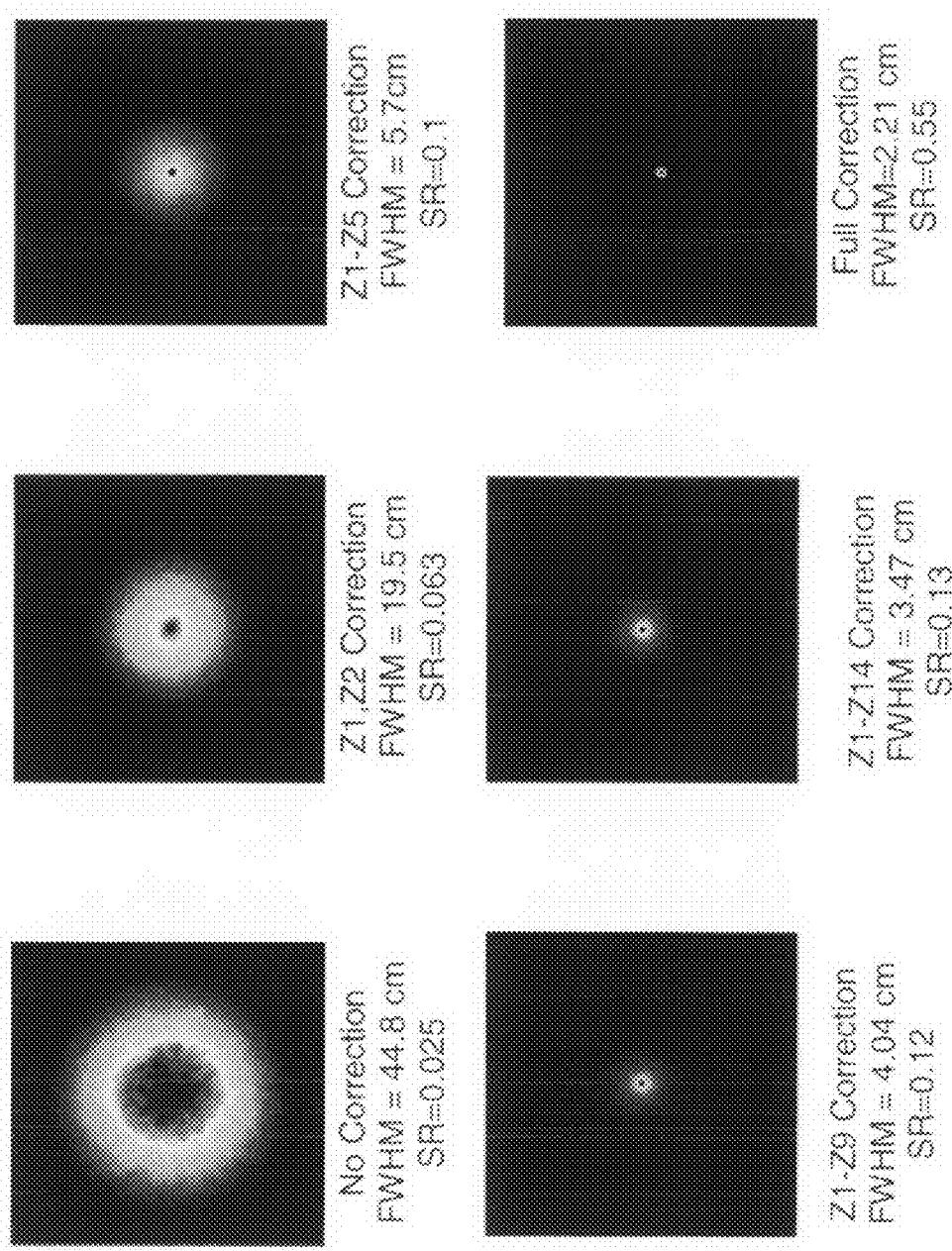
FIG. 4 compares uncorrected beam with beams with a variety of Zernike mode corrections.

FIG. 4 illustrates Applicants' third finding. This figure shows the intensity pattern at a 10 km range target for an uncorrected beam and corrected beams with differing number of corrected Zernike modes. Correction of Zernike modes is described in Reference 15 in the background section of this specification. It is seen that correction of a limited number of low-order Zernike modes significantly increases the Strehl ratio and reduces a beam spot size. Correcting a limited number of Zernike modes instead of all actuators of a deformable mirror reduces the number of free parameters controlled by the optimization algorithm, thus simplifying the implementation of the beam control algorithm. Based on these findings, we introduce a concept of a WSPGD AO system.

WSPGD Adaptive Optics System Concept

Figure 5:
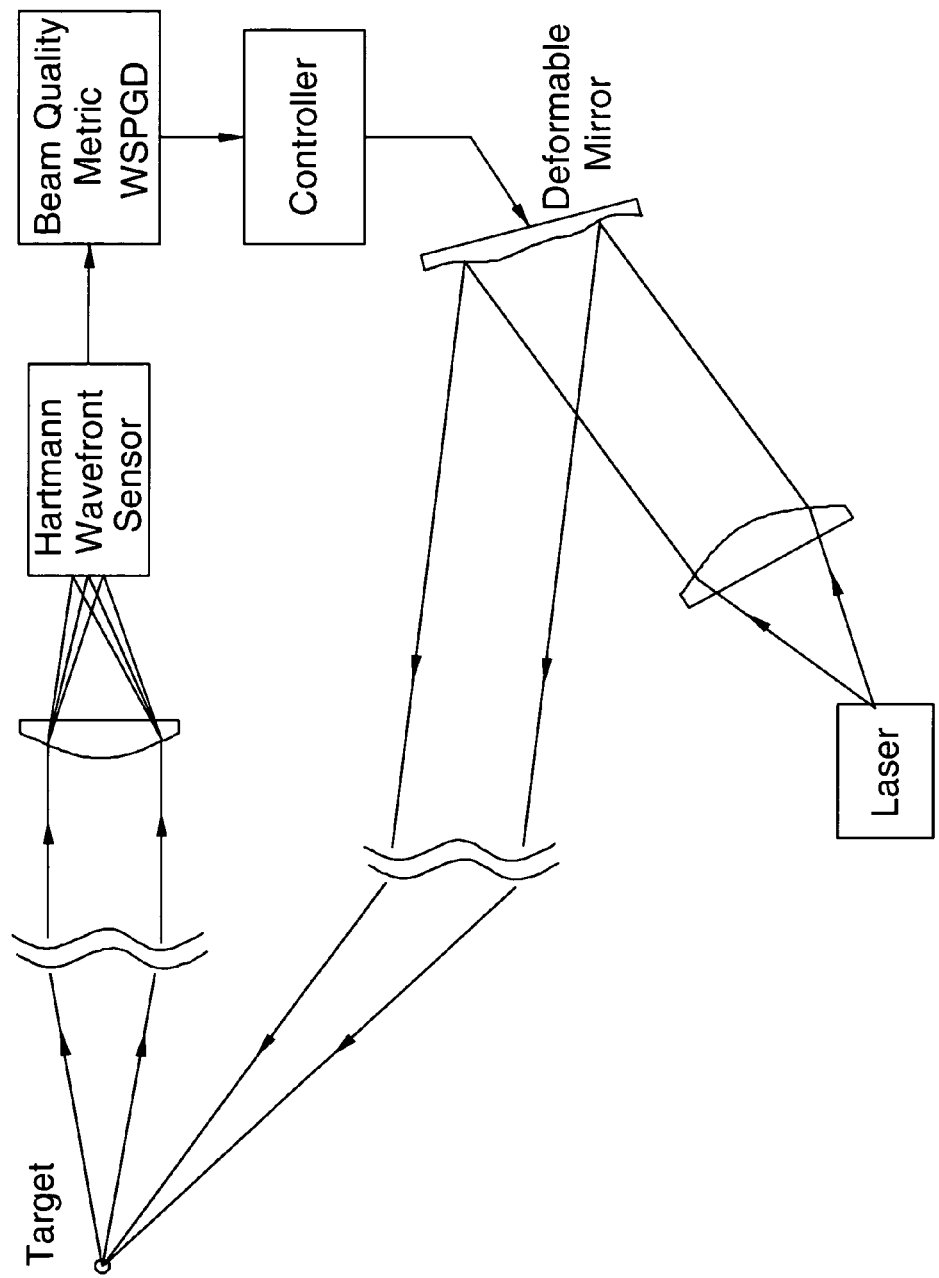
FIG. 5 is a block diagram of a preferred embodiment of the present invention.

A block diagram of the WSPGD adaptive optics system 2 is shown in FIG. 5. It includes a deformable mirror 4, an off-axis wavefront sensor 6, and a controller 8. As opposed to a conventional phase conjugate adaptive optics system, in Applicants' system the wave front sensor does not see the deformable mirror. This is because the wavefront measurements of laser return are not applied to the outgoing beam, but used to estimate a performance metric in order to provide feedback to the beam control algorithm.

The system operates as follows. The wave front sensor measures wave front distortions of a laser return from the target. The beam quality metric is defined as one over the variance of the differential wavefront slopes, averaged over all the sub-apertures of the wave front sensor.

$$J(t_n) = 1/\sigma_{\Delta\phi}^2(t_n) \tag{1}$$

The control commands to the deformable mirror are independently varied, and the performance metric is minimized through gradient descent. The variance of the differential wavefront slopes increases as the solution for the actuator commands converges, and the beam spot diameter reduces. The reader should note that because phase measurements performed by all the sub-apertures of the wave front sensor are used to estimate a single quantity, the space averaged variance of the differential wavefront slopes, the space averaged variance is not sensitive to the turbulence-induced scintillation.

Description and Implementation of WSPGD Adaptive Optics Algorithm

The standard stochastic parallel gradient decent (SPGD) algorithm is a derivative based approach for minimization (or maximization) of a cost function. The principle operation consists of a gradient estimation based on control parameter perturbations. A local minimum of the cost function is approached by incremental adjustment of the control parameters in the direction of the negative of the gradient of this function at the current point.

An advantage of gradient descent algorithms is that the solution can be found without prior knowledge of the system or input parameters. One of the key benefits of SPGD algorithms is that minimization should occur in a timely manner, regardless of the number of control parameters used. The structure of the algorithm does not change since all control parameters are simultaneously perturbed. This requires only two perturbations per iteration of gradient assessment, decreasing the number of measurements leading to convergence.

Gradient descent algorithms operate by applying slight disturbances above and below a current state of a given function, coupled with measurements of the resulting feedback. These disturbances can be represented in Equation 2 as $c_k \Delta_k$, where $c_k$ represents a diminishing perturbation width and $\Delta_k$ is a random number determined by Bernoulli distribution.

$$\hat{\theta}_k^+ = \hat{\theta}_k + c_k \Delta_k, \hat{\theta}_k^- = \hat{\theta}_k - c_k \Delta_k \tag{2}$$

Based on a vector of motion, determined by the normalized difference of performance metric feedback, the gradient descent algorithm can determine the amount of motion and the desired direction to move.

$$\hat{g}_k(\hat{\theta}_k) = \frac{y(\hat{\theta}_k^+) - y(\hat{\theta}_k^-)}{2 c_k \Delta_k} \tag{3}$$

The gradient is then multiplied by a diminishing gain, $a_k$, which reduces as a function of iteration number as shown in Eq. 4, where a is the initial gain applied to the system, k is the iteration number, A is a damping coefficient and $\alpha$ is the gain decrement factor.

$$a_k = \frac{a}{(k+A)^\alpha} \tag{4}$$

The algorithm motion is determined by taking the current state and subtracting the product of Equations. 3 and 4. As $k \to \infty$, the gain $a_k \to 0$ and the algorithm reaches a steady state solution. The choice of gain coefficient is critical to the performance.

The implementation of the WSPGD algorithm is very similar to that of the SPGD. A uniqueness of the WSPGD algorithm implementation is associated with the use of variance of differential wavefront slopes to provide feedback to the beam control algorithm. The WSPGD algorithm maximizes the differential wavefront slope variance of laser return, which corresponds to a minimal beam spot size at the target.

In a conventional phase conjugate system, the wavefront sensor controls the deformable mirror. The number of control parameters corresponds to the number of actuators of the deformable mirror. The use of Zernike coefficients in the WSPGD implementation effectively reduces the number of free parameters from the number of deformable mirror actuators to a limited number of coefficients. The robustness of the WSPGD structure allows for multiple Zernike polynomials to be simultaneously controlled for correction of both low and high order aberrations. By controlling a limited number of relatively low-order Zernike modes (for example $\leq 14$), a vast improvement in the Strehl ratio and reduction in the beam spot size can be achieved, yielding a quicker convergence but providing sufficient compensation.

Simulation Results

Applicants evaluated the WSPGD adaptive optics system performance in simulation using a wave-optics code. A propagation path was modeled using ten equally spaced turbulent layers. Each turbulent layer was generated as a phase screen and applied at the middle of each layer. The phase screens were generated with a white noise filtering approach, and an approach corresponding to the von Karman power spectrum $$\phi_n(f) = \frac{0.00969 C_n^2 \Delta z}{(f^2 + (1/L_0)^2)^{11/6}} \quad (5)$$

was simulated. In the power spectrum, the thickness of the layer was chosen to be $\Delta z = 0.2$ km for $L=2$ km and $\Delta z = 2$ km for $L=20$ km, the turbulence outer scale was $L_0 = 5$ m, and f was the spatial frequency with units of inverse meters. All screens were generated as 512×512 arrays with sample spacing, $\Delta x$, which varies from $\Delta x = 2$ mm to $\Delta x = 3$ mm. A target plane tracker was used to stabilize a line-of-sight in a corrected beam. An image of a corrected beam in the target plane was used to provide an input for the tracker.

Figure 7A:
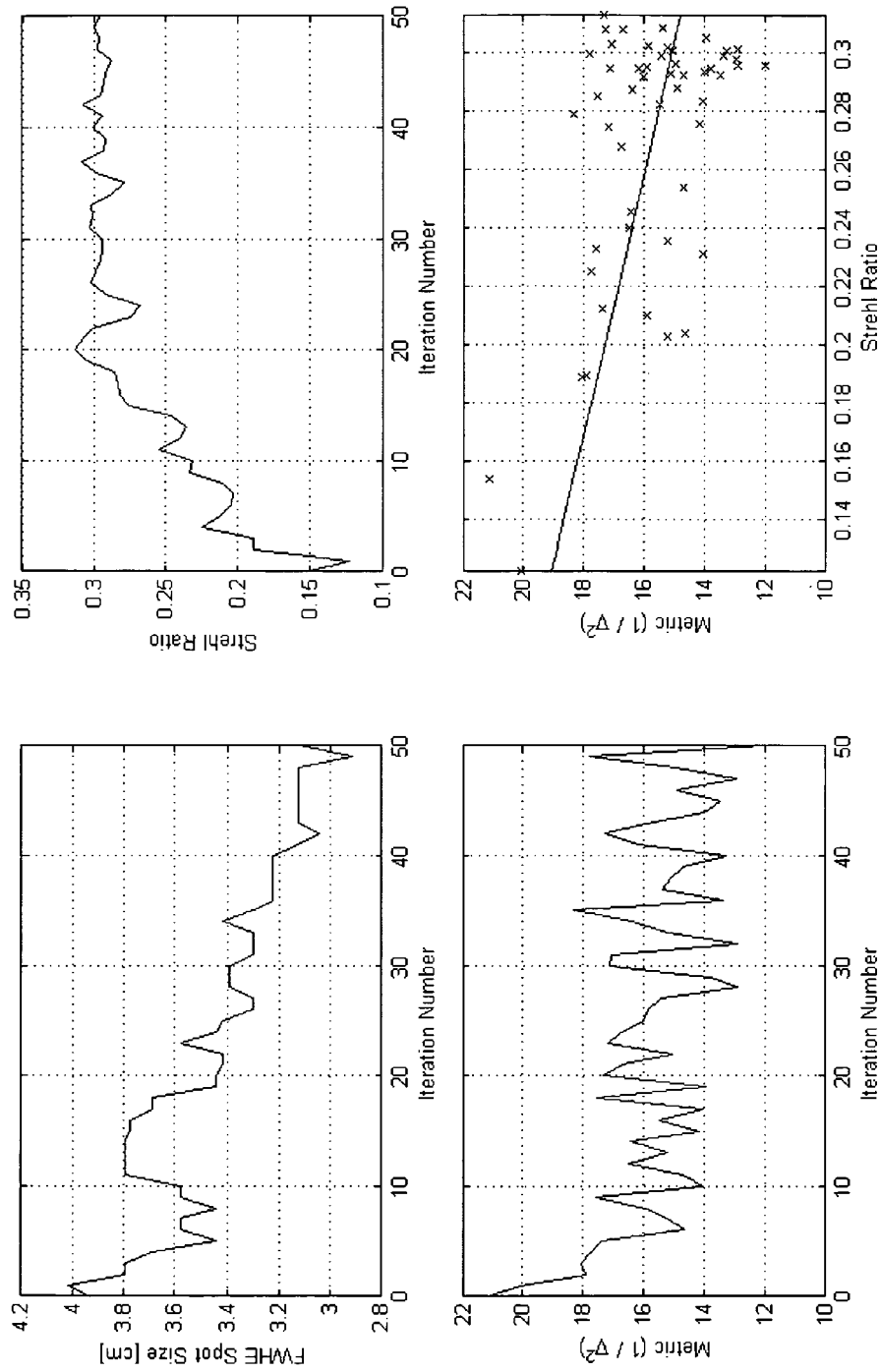
Figure 7B:
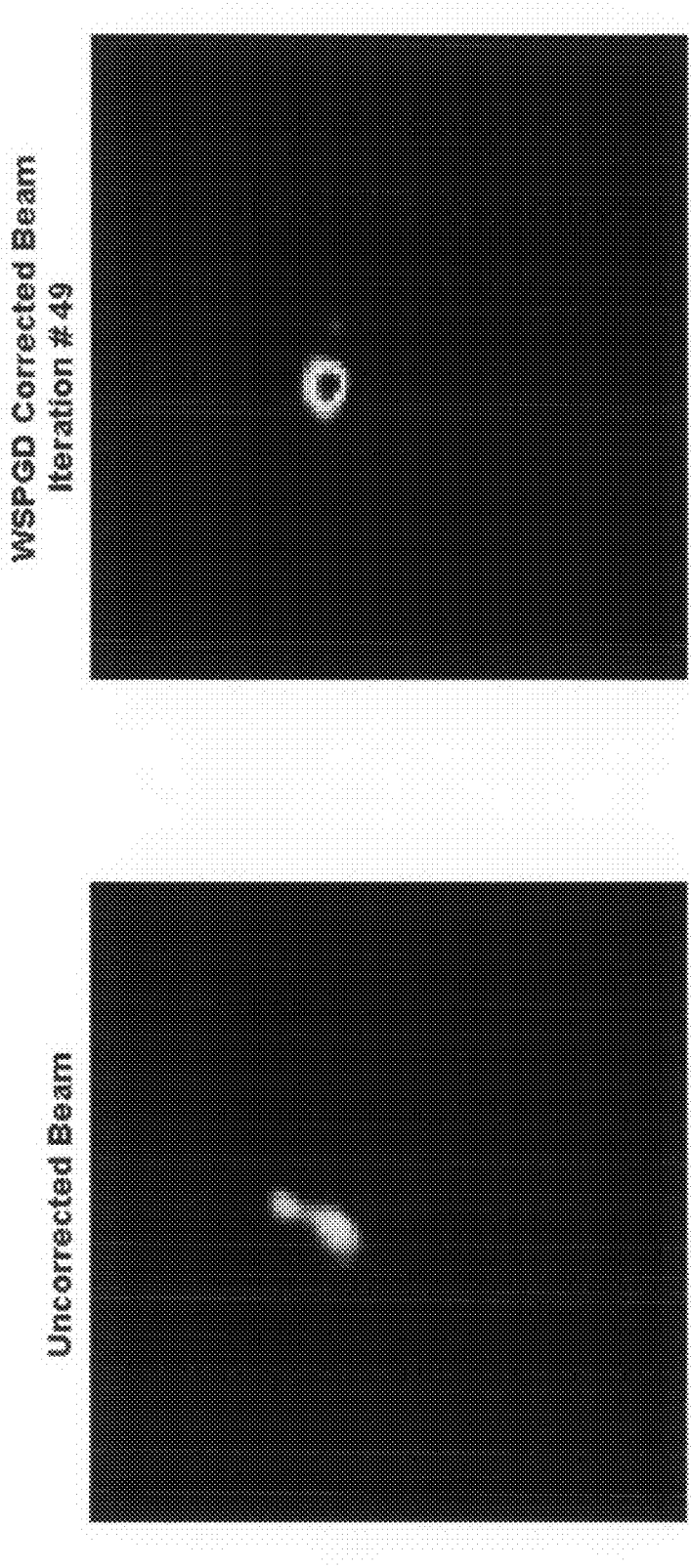
Figure 8A:
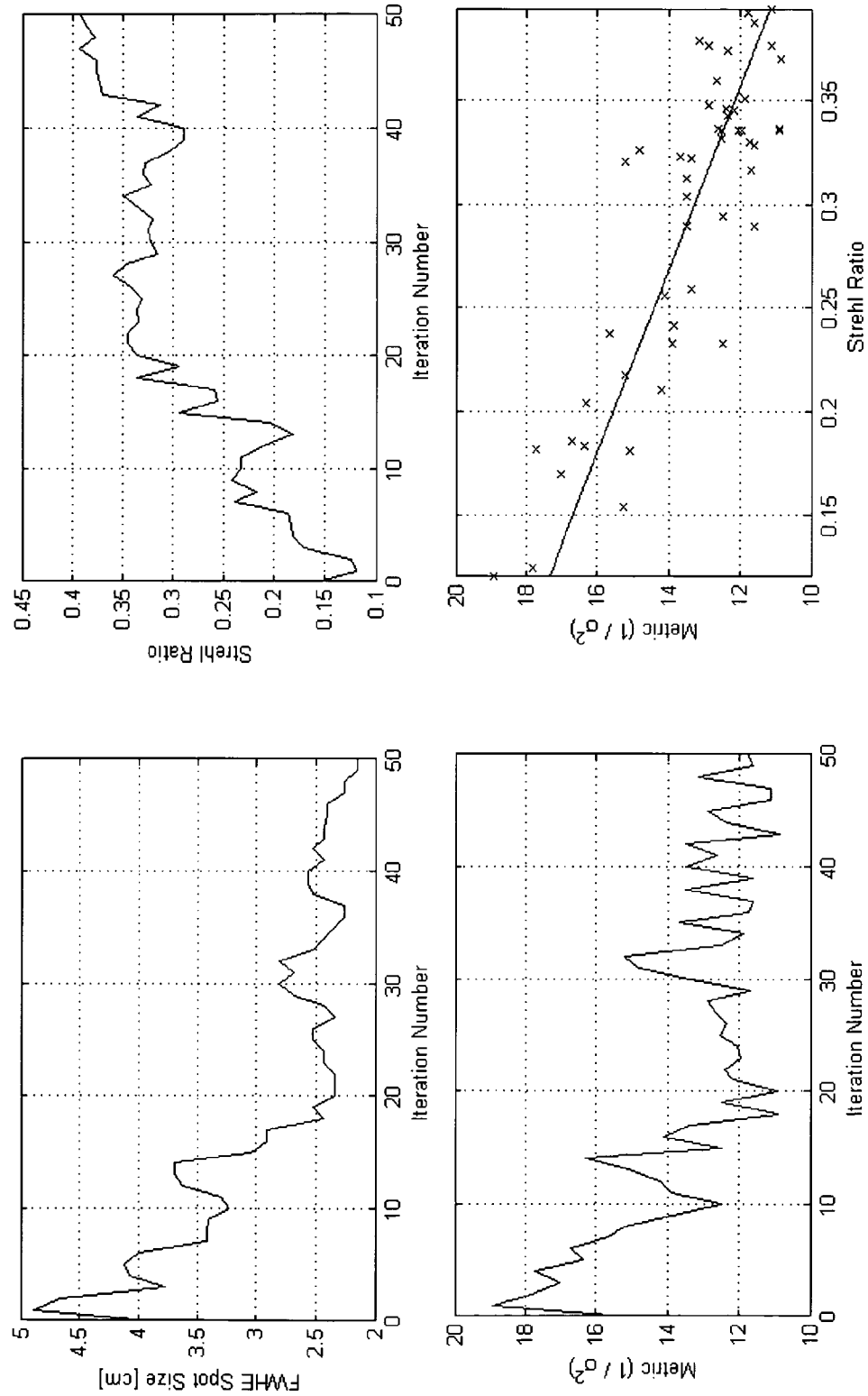
Figure 8B:
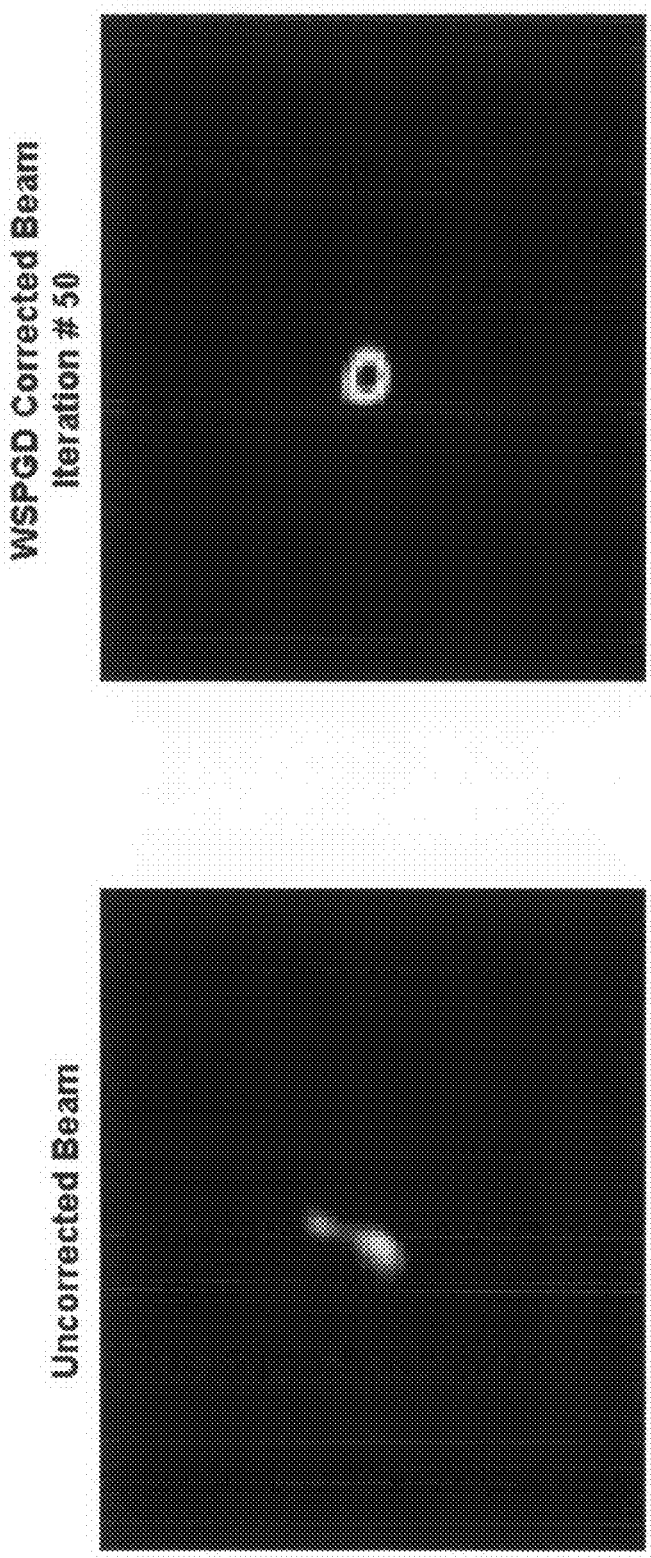
Figure 9A:
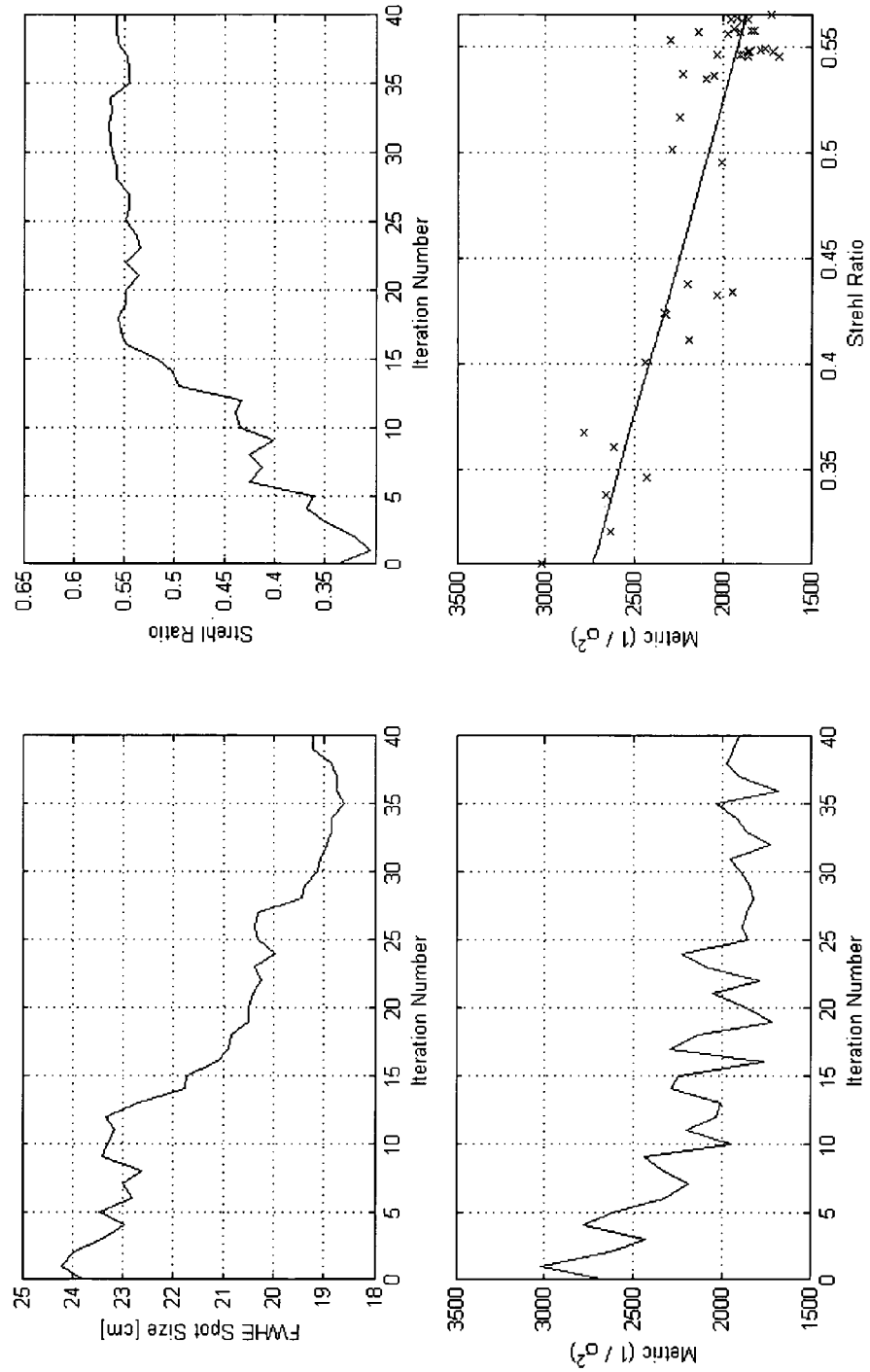
Figure 9B:
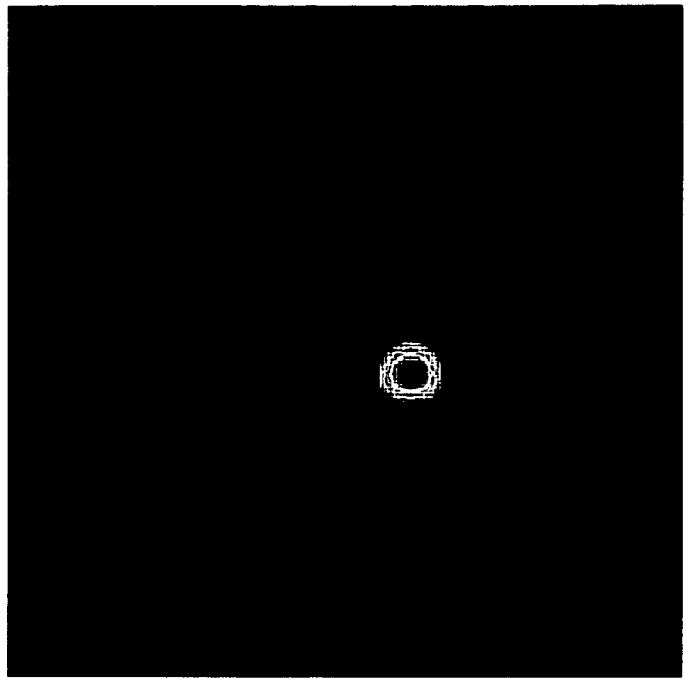
Figure 9B:
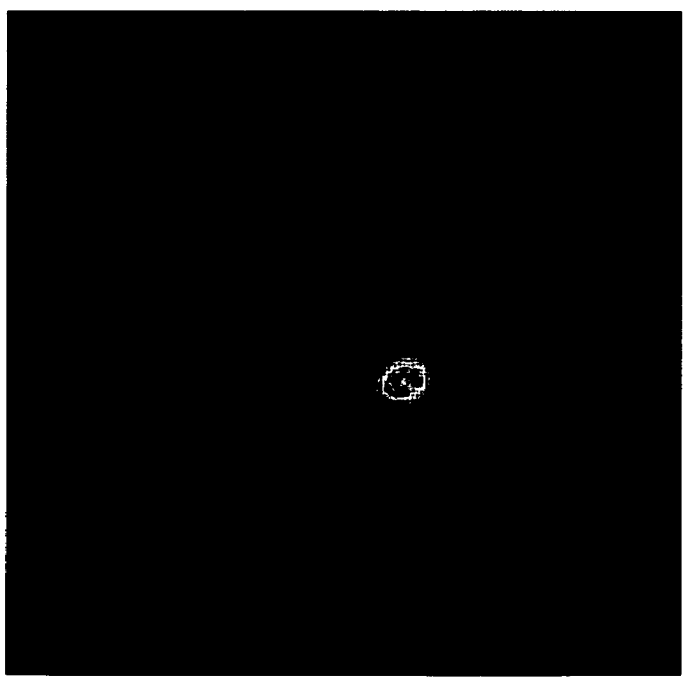
Figure 10A:
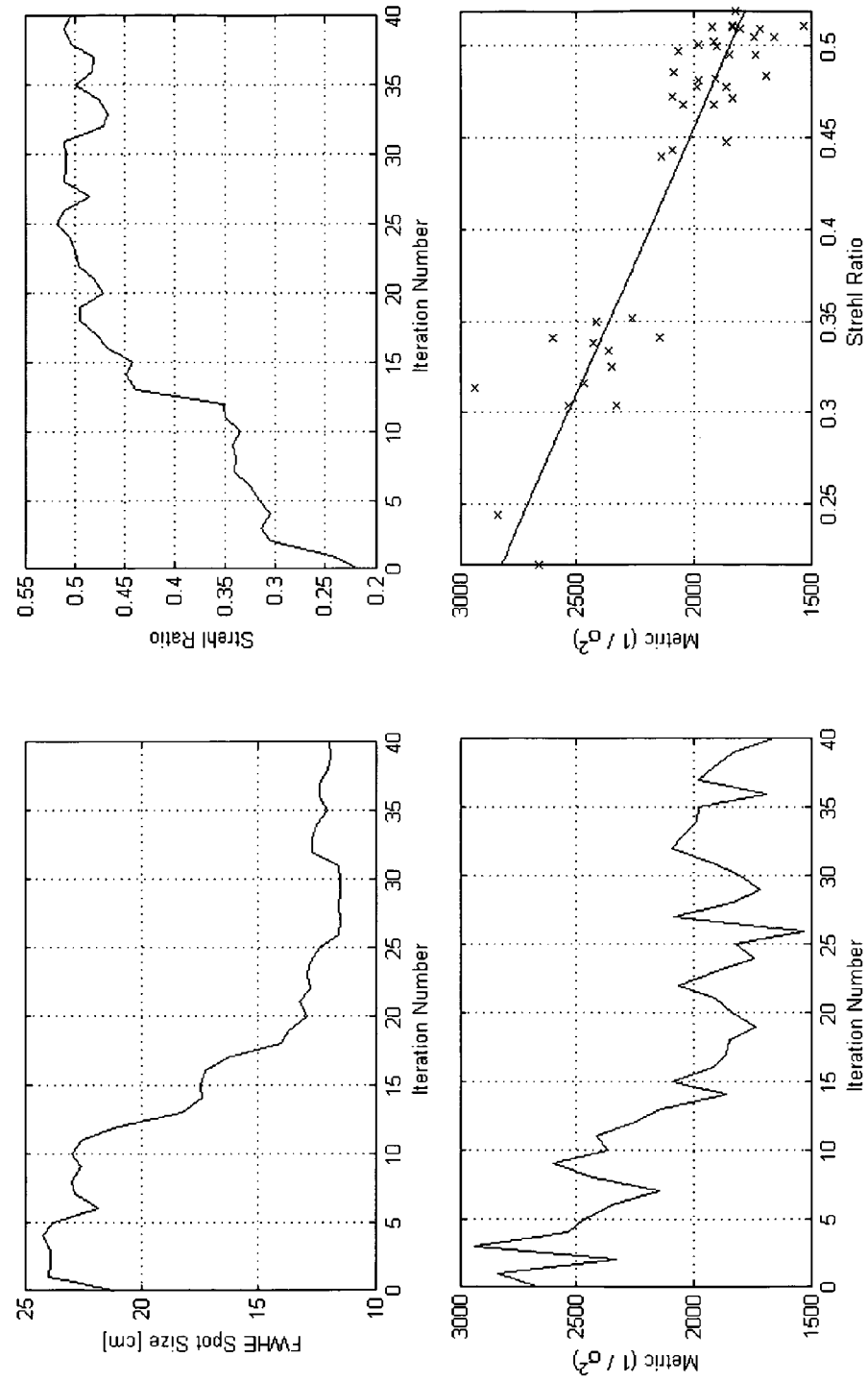
FIGS. 10A and 10B compares simulation results.
Figure 10B:
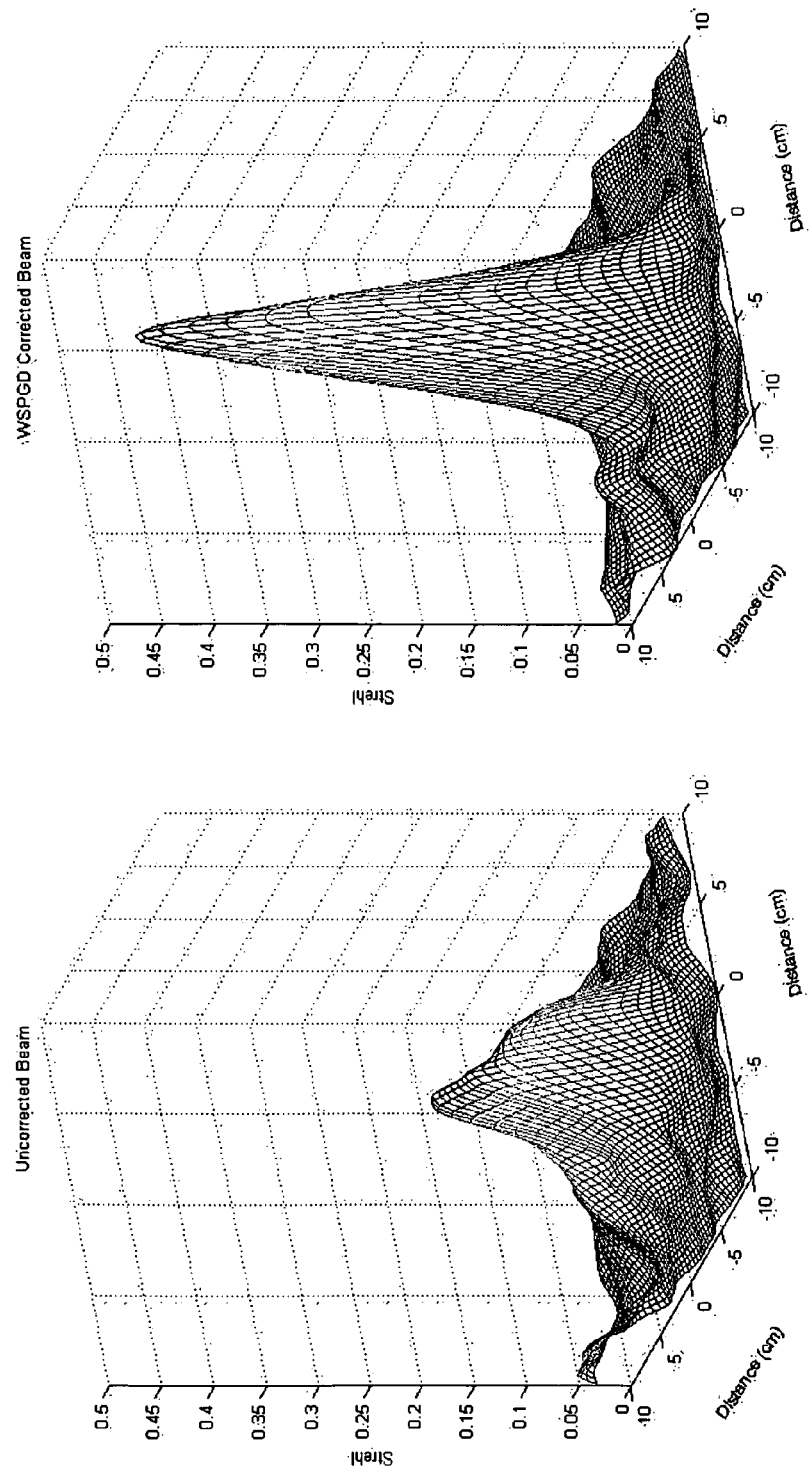

The simulation results for two tactical engagement scenarios are summarized below. FIGS. 6-8 present results for 2 km range. The system and atmospheric parameters used in this scenario are: wavelength $\lambda = 1.55$ μm, $C_n^2 = 3 \times 10^{-14}$ m$^{-2/3}$, $\sigma_x^2 = 0.6$, Fried parameter $r_0 = 2.7$ cm, aperture diameter $D = 0.25$ m, $D/r_0 = 9$, isoplanatic angle $\theta_0 = 7.6$ μrad, ratio of beam angular size at the target to isoplanatic angle $\theta_B/\theta_0 = 8$, and ratio of the diffraction limit to the isoplanatic angle $\theta_D/\theta_0 = 1$, where $\theta_D = 1.22(\lambda/D)$. FIGS. 9-10 present simulation results for 20 km range. The system and atmospheric parameters used in this case are: $\lambda = 1.55$ cm, $C_n^2 = 1 \times 10^{-15}$ m$^{-2/3}$, $\sigma_x^2 = 1.2$, $r_0 = 5.2$ cm, $D = 0.5$ m, $D/r_0 = 10$, $\theta_0 = 1.5$ μrad, $\theta_B/\theta_0 = 20$, and $\theta_D/\theta_0 = 2.6$.

Each figure includes two sets of plots. The first set of plots characterizes the convergence of the WSPGD algorithm. It includes graphs of the full width half energy (FWHE) of the beam spot size at the target, Strehl ratio, and performance metric, each versus number of iterations, as well as a correlation graph between the performance metric and FWHE or Strehl ratio. The FWHE of the beam spot size at the target is given in centimeters. The second set of plots compares an uncorrected beam and a corrected beam using the WSPGD algorithm. This comparison is made using 2-D intensity patterns at the target or 3-D images at the target.

Figure 6A:
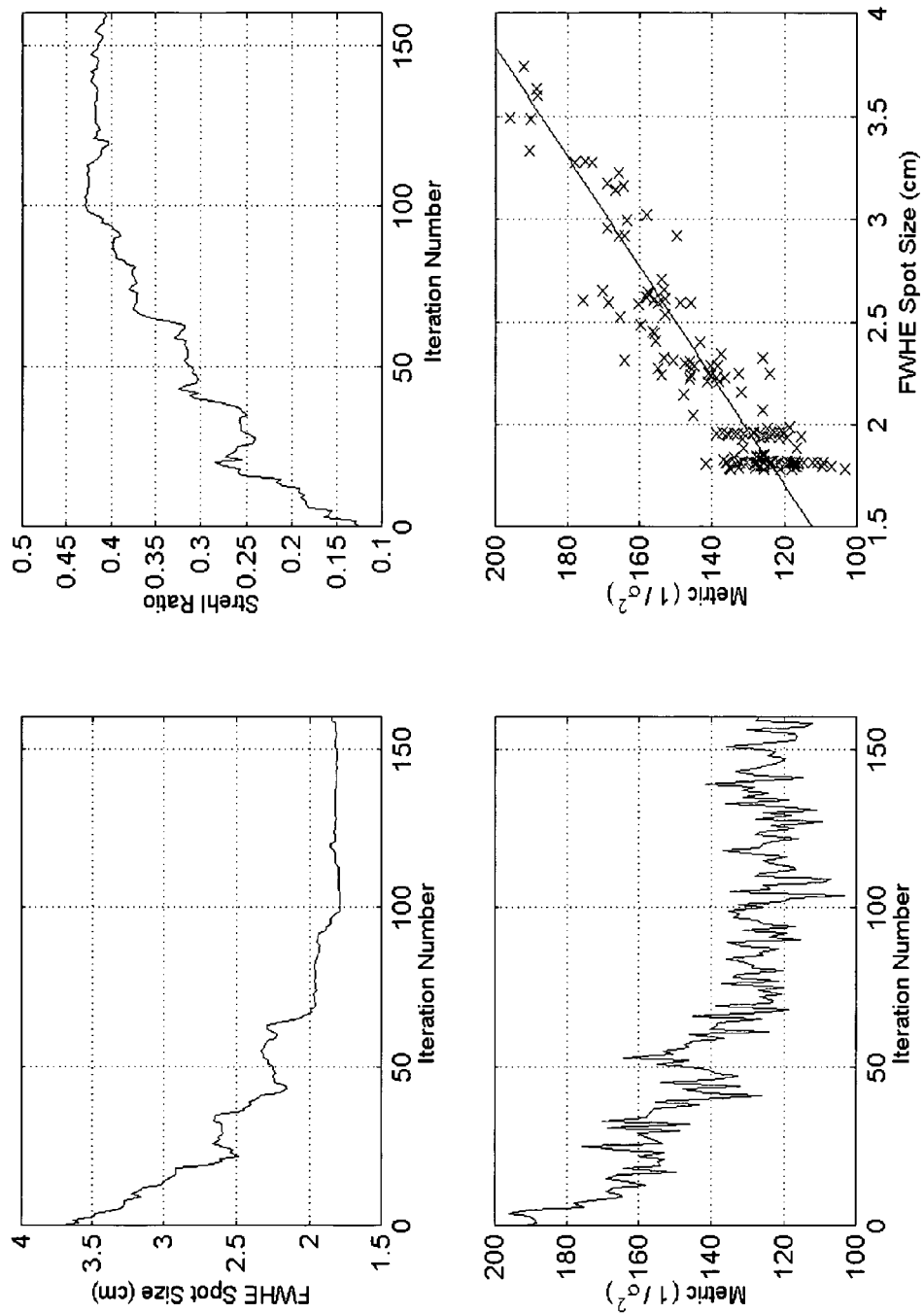
FIGS. 6 through 9B present simulation results.
Figure 6B:
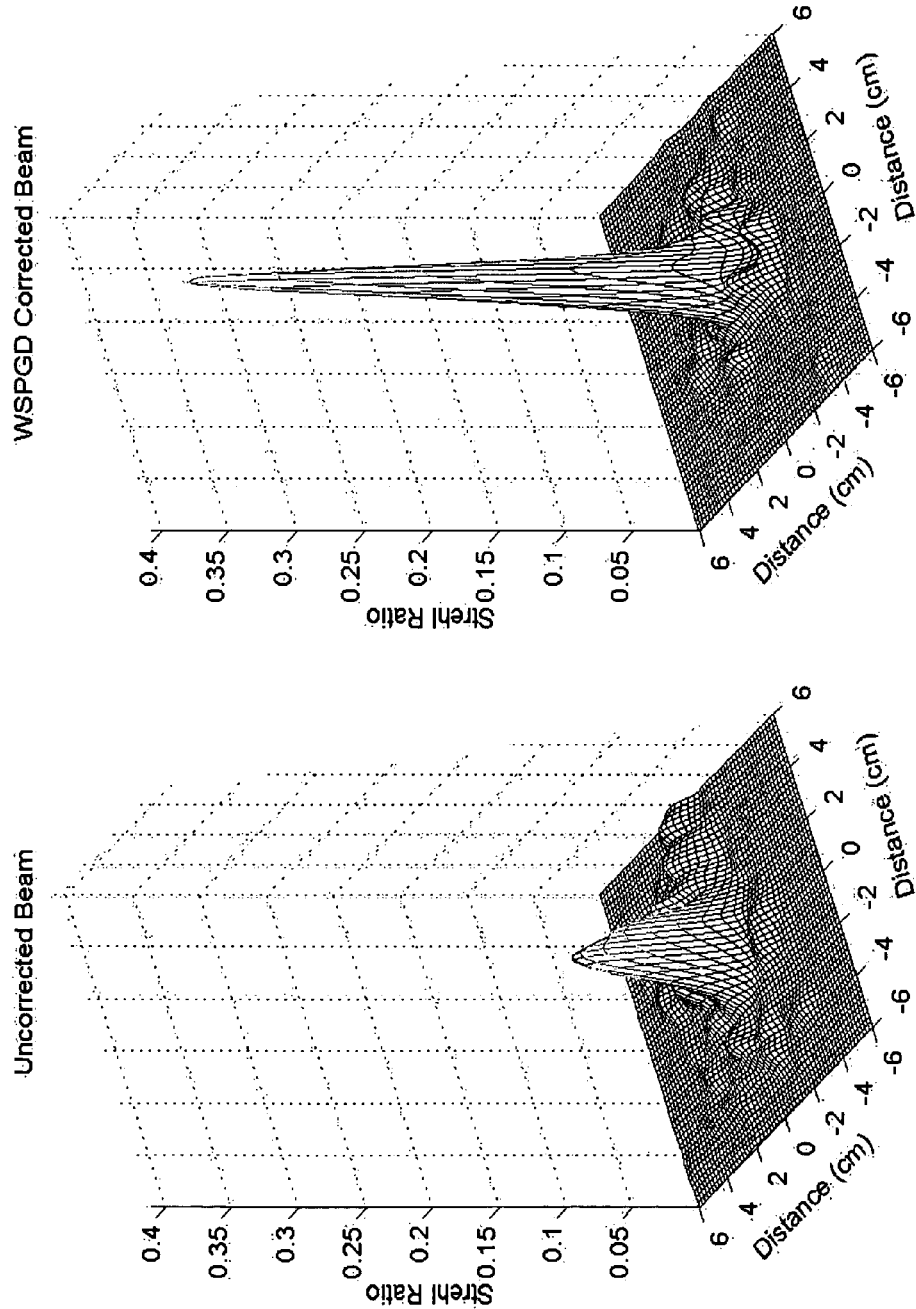

FIG. 6 presents simulation results for 2 km range, $D/r_0 = 9$, $\theta_B/\theta_0 = 8$, $\theta_D/\theta_0 = 1$, and correction of 9 Zernike modes. In this case, we use a shearing interferometer with 8 mm separation between sub-apertures for differential slope measurements. Note that after 100 iterations, the Strehl ratio has increased by a factor of 3.3 and the FWHE of the beam spot size at the target has reduced in half. The beam quality metric reduces with the number of iterations. Finally, the plot on the bottom right of FIG. 6A shows a linear relationship between the beam quality metric and the FWHE. Since the metric is defined as one over the differential wavefront slope variance, this confirms Applicants' second finding that there exists an inverse relationship between beam spot size and phase variance.

FIG. 7 also depicts simulation results for 2 km range, $D/r_0 = 9$, $\theta_B/\theta_0 = 8$, $\theta_D/\theta_0 = 1$ and correction of 9 Zernike modes. It however uses a Hartmann wave front sensor, instead of a shearing interferometer, to measure differential wavefront slope variance. The WSPGD algorithm again converges and corrects the effects of strong turbulence and beacon anisoplanatism. Note the Strehl more than doubles in only 20 iterations. By 50 iterations the FWHE spot size has decreased from 4 cm to 3 cm, a factor of 1.4. The beam quality metric reduces with the number of iterations, and simulation reveals an inverse linear relationship between the beam quality metric and the Strehl ratio, or a linear relationship between phase variance and Strehl.

FIG. 8 presents simulation results for the same conditions and Hartmann wave front sensor, but with 14 Zernike modes corrected. Note that after 50 iterations, the Strehl has increased by a factor of 2.7, and the FWHE spot size has been reduced in half. FIGS. 7 and 8 demonstrate the difference in performance of 9 and 14 corrected Zernike modes, respectively. It is also seen that the beam quality metric reduces with the number of iterations, and the differential wavefront slope variance is proportional to the Strehl ratio.

FIGS. 9 and 10 present simulations results for 20 km range, $D/r_0 = 10$, $\theta_B/\theta_0 = 20$, $\theta_D/\theta_0 = 2.6$, correction of 9 Zernike modes, and use of a shearing interferometer wave front sensor. Both figures show a convergence of the WSPGD algorithm after 15-20 iterations, providing compensation of Beacon Anisoplanatism in strong turbulence conditions ($\sigma_x^2 = 1.2$), when the beam spot size at the target exceeds the isoplanatic angle by a factor of 20, and the diffraction limit exceeds the isoplanatic angle by a factor of 2.6

In FIG. 9, after 15 iterations, the Strehl ratio increases by a factor of 1.7 and a FWHE is reduced by a factor of 1.3. FIG. 10 shows a Strehl ratio gain of 2.3 and a FWHE reduction of 1.8. In both cases, the beam quality metric gradually decreases with number of iterations. Also the differential wavefront slope variance is proportional to the Strehl ratio. The implication is that the WSPGD adaptive optics system can efficiently mitigate the effects of strong turbulence including beacon anisoplanatism even under conditions when ratio of the beam spot size to isoplanatic angle equals $\theta_B/\theta_0 = 20$ and the diffraction limit exceeds the isoplanatic angle. A laboratory demonstration performed in a follow-on study confirmed these theoretical predictions.

Analysis of Simulations

The following results have been developed:

Applicants improved the target-in-the-loop beam control approach developed by M. Vorontsov with modifications to incorporate Applicants' recent discoveries. They introduced the concept of a WSPGD adaptive optics system, which uses off-axis wavefront measurements of laser return from the target to provide feedback for the optimization algorithm.

The WSPGD beam control approach is based the following findings:
 i. the phase aberrations of laser return contain information about beam spot size at the target;
 ii. the variance of the differential wavefront slopes of laser return depends inverse proportionally on beam spot size at the target; and
 iii. correction of a limited number of low-order Zernike modes significantly increases both on-axis intensity and power in the bucket of an intensity pattern at the target.

Applicants evaluated the WSPGD adaptive optics system performance in simulation using wave optics code for two tactical engagement scenarios.

Applicants found that the WSPGD adaptive optics system can efficiently compensate the effects of turbulence, including beacon anisoplanatism in deep turbulence conditions, even when the diffraction limit exceeds the isoplanatic patch size.

The Strehl ratio increases by a factor of 2-3.6 for L=2 km range, and wave propagation parameters: $\sigma_x^2=0.6$, $D/r_0=9$, $\theta_B/\theta_0=8$, $\theta_D/\theta_0=1$, and by a factor of 1.6-2.5 for L=20 km range, $\sigma_x^2=1.2$, $\theta_B/\theta_0=20$, $\theta_D/\theta_0=2.6$.

The WSPGD adaptive optics system is immune to the effects of strong turbulence including beacon anisoplanatism because the WSPGD metric uses the phenomenology of turbulence to generate valid signal.

Applicants experimentally validated our simulation results in the laboratory setup. A laboratory demonstration confirmed these predictions.

VARIATIONS

Although the invention has been described in terms of preferred embodiments, those who are skilled in the art will recognize that other modifications and improvements will therefore occur to those skilled in the art upon reading the foregoing description. The embodiment described herein is based on specific architectures but the present invention is not so limited. For example, the invention may be used as a directed energy system to destroy targets with the laser beam or it could be used at much lower energy values as a laser designator. The wave front sensor can be off axis or on axis. A variety of lasers, wave front sensors, controllers, processors and deformable mirrors can be used. So the scope of the invention should be determined by the appended claims and their legal equivalence.

What is claimed is:

1. An adaptive optics system comprising:
   A) a laser system, comprising a laser and a deformable mirror, adapted to illuminate a target with a high energy laser beam corrected for atmospheric distortion,
   B) a wave front sensor adapted to measure wave fronts of beams reflected from the target,
   C) a controller adapted to control components of the deformable mirror, and
   D) a high speed computer processor programmed with an algorithm adapted to analyze frequency components in the reflected beams measured by wave front sensor, to calculate phase variances of the reflected laser beam and to use the calculated phase variance values as feedback values to iteratively control segments of the deformable mirror in order to compensate for atmospheric distortion and to minimize laser spot sizes on the target; wherein said high speed computer processor is also programmed with an algorithm adapted to correct a limited number of Zernike modes associated with the wave front.

2. The system as in claim 1 wherein said wave front sensor is positioned off axis.

3. The system as in claim 1 wherein the laser is a high energy laser adapted to produce sufficient energy to destroy the target.

4. The system as in claim 1 wherein the system is adapted to function as a target designator.

5. A process for illuminating a target through atmospheric distortion with a high energy laser comprising the steps of:
   A) directing a high energy laser beam produced by a high energy laser system to a deformable mirror system adapted to redirect the laser beam through an atmosphere to a target,
   B) monitoring laser beams reflected from the target to determine phase variances in the reflected beams,
   C) analyzing the phase variances with a high speed computer processor programmed with an algorithm for analyzing frequency components measured by wave front sensor to calculate phase variance of the reflected laser beam and using the calculated phase variance values as feedback values to iteratively control segments of the deformable mirror in order to compensate for atmospheric distortion and to minimize laser spot sizes on the target; wherein said high speed computer processor is also programmed with an algorithm for correcting a limited number of Zernike modes associated with the wave front.

* * * * *